United States Patent
Dong et al.

(10) Patent No.: US 11,854,255 B2
(45) Date of Patent: Dec. 26, 2023

(54) HUMAN-OBJECT SCENE RECOGNITION METHOD, DEVICE AND COMPUTER-READABLE STORAGE MEDIUM

(71) Applicant: UBKang (Qingdao) Technology Co., Ltd., Qingdao (CN)

(72) Inventors: Chuqiao Dong, Pasadena, CA (US); Dan Shao, San Gabriel, CA (US); Zhen Xiu, Chino Hills, CA (US); Dejun Guo, San Gabriel, CA (US); Huan Tan, Pasadena, CA (US)

(73) Assignee: UBKANG (QINGDAO) TECHNOLOGY CO., LTD., Qingdao (CN)

( * ) Notice: Subject to any disclaimer, the term of this patent is extended or adjusted under 35 U.S.C. 154(b) by 289 days.

(21) Appl. No.: 17/386,531

(22) Filed: Jul. 27, 2021

(65) Prior Publication Data
US 2023/0030837 A1 Feb. 2, 2023

(51) Int. Cl.
*G06V 20/10* (2022.01)
*G06T 7/11* (2017.01)
(Continued)

(52) U.S. Cl.
CPC .............. *G06V 20/10* (2022.01); *G06T 7/11* (2017.01); *G06T 7/70* (2017.01); *G06V 40/10* (2022.01);
(Continued)

(58) Field of Classification Search
CPC ........ G06V 20/10; G06V 40/10; G06V 20/52; G06V 20/64; G06V 40/103; G06T 7/11;
(Continued)

(56) References Cited

U.S. PATENT DOCUMENTS 9,639,084 B2 * 5/2017 Nakamura ........... G05D 1/0246
10,482,681 B2 11/2019 Kutliroff
(Continued)

FOREIGN PATENT DOCUMENTS

| CN | 110745140 A |   | 2/2020 |             |
|----|-------------|---|--------|-------------|
| CN | 111753638 A | * | 10/2020 | ......... G06K 9/00201 |

(Continued)

OTHER PUBLICATIONS

ISR for PCT/CN2022/107908.
Written opinions of ISA for PCT/CN2022/107908.

*Primary Examiner* — Matthew C Bella
*Assistant Examiner* — Pardis Sohraby

(57) ABSTRACT

A human-object scene recognition method includes: acquiring an input RGB image and a depth image corresponding to the RGB image; detecting objects and humans in the RGB image using a segmentation classification algorithm based on a sample database; in response to detection of objects and/or humans, performing a segment detection to each of the detected objects and/or humans based on the ROB image and the depth image, and acquiring a result of the segment detection; calculating 3D hounding boxes for each of the detected objects and/or humans according to the result of the segment detection, and determining a position of each of the detected objects and/or humans according to the 3D bounding boxes.

20 Claims, 12 Drawing Sheets

(51) Int. Cl.
*G06T 7/70* (2017.01)
*G06V 40/10* (2022.01)

(52) U.S. Cl.
CPC ............... *G06T 2207/10024* (2013.01); *G06T 2207/10028* (2013.01); *G06T 2207/30196* (2013.01)

(58) Field of Classification Search
CPC ............ G06T 7/70; G06T 2207/10024; G06T 2207/10028; G06T 2207/30196
USPC ........................................................ 382/103
See application file for complete search history.

(56) References Cited

U.S. PATENT DOCUMENTS

| | | | |
|---|---|---|---|
| 11,436,743 B2* | 9/2022 | Guizilini | G06T 7/521 |
| 11,587,338 B2* | 2/2023 | Ye | G06V 20/647 |
| 2018/0108137 A1* | 4/2018 | Price | G06N 3/08 |
| 2020/0066036 A1* | 2/2020 | Choi | G06T 7/75 |
| 2020/0394848 A1* | 12/2020 | Choudhary | G06T 7/11 |
| 2022/0270327 A1* | 8/2022 | Sivakumar | G06V 40/103 |

FOREIGN PATENT DOCUMENTS

| | | | | |
|---|---|---|---|---|
| CN | 111753638 A | | 10/2020 | |
| CN | 111844101 A | * | 10/2020 | ............... B07C 5/34 |

\* cited by examiner

HUMAN-OBJECT SCENE RECOGNITION METHOD, DEVICE AND COMPUTER-READABLE STORAGE MEDIUM

TECHNICAL FIELD

The present disclosure generally relates to field of object recognition, and particularly to a human-object scene recognition method, device and computer-readable storage medium.

BACKGROUND

Scene understanding is a deeper level of object detection, recognition and reasoning based on image analysis. On the basis of image understanding, image data is processed to obtain an understanding of the content of the scene reflected in the image.

Conventional image resource utilization typically analyzes low-level visual features, such as color, shape, and texture. However, low-level visual features only represent visual information. With the semantic information contained in the image content ignored, the positioning errors of objects and/or humans are large, and there is a deviation in the understanding of the scene in the images.

Therefore, there is a need to provide a method and a device to overcome the above-mentioned problem.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
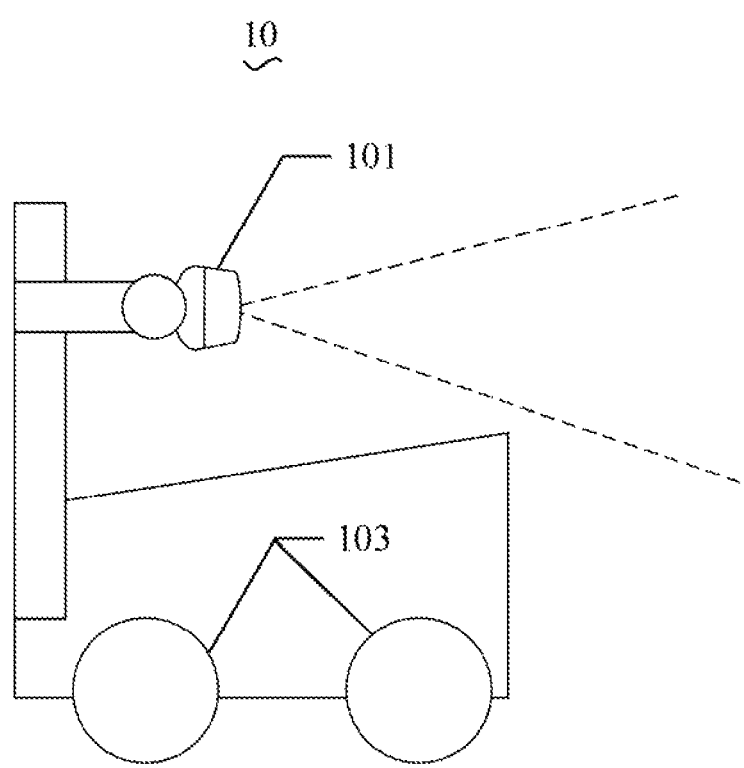
FIG. 1 is a schematic diagram of a robot according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

Figure 2:
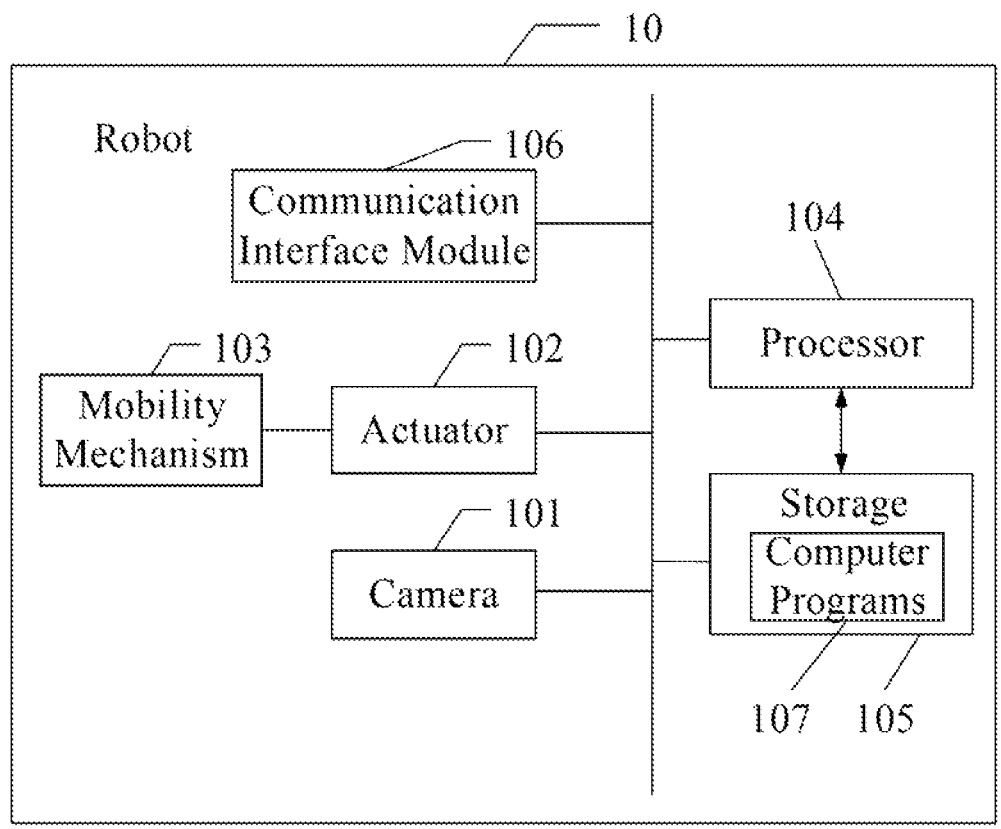
FIG. 2 is a schematic block diagram of the robot according to one embodiment.

FIG. 1 is a schematic diagram of a robot 10 according to one embodiment. FIG. 2 is a schematic block diagram of the robot 10 according to one embodiment. The robot 10 may be a mobile robot (e.g., wheeled robot). The robot 10 can operate in various application environments, such as hospitals, factories, warehouse, malls, streets, airports, home, elder care centers, museums, restaurants, hotels, and even wild fields, etc. However, the example of FIG. 1 is merely an illustrative example. The robot 10 may be other types of robots.

In one embodiment, the robot 10 may include a camera 101, an actuator 102, a mobility mechanism 103, a processor 104, a storage 105, and a communication interface module 106. The camera 101 may be, for example, an RGB-D three-dimensional sensor arranged on the body of the robot 10. The camera 101 is electrically connected to the processor 104 for transmitting the captured image data to the processor 104. The actuator 102 may be a motor or a servo. The mobility mechanism 103 may include one or more wheels and/or tracks, and wheels are illustrated in FIG. 1 as an example. The actuator 102 is electrically coupled to the mobility mechanism 103 and the processor 104, and can actuate movement of the mobility mechanism 103 according to commands from the processor 104.

The storage 105 may include a non-transitory computer-readable storage medium. One or more executable computer programs 107 are stored in the storage 105. The processor 104 is electrically connected to the storage 105, and perform corresponding operations by executing the executable computer programs stored in the storage 105. The communication interface module 106 may include a wireless transmitter, a wireless receiver, and computer programs executable by the processor 104. The communication interface module 106 is electrically connected to the processor 104 and is configured for communication between the processor 104 and external devices. In one embodiment, the camera 101, the actuator 102, the mobility mechanism 103, the processor 104, the storage 105, and the communication interface module 106 may be connected to one another by a bus.

Figure 8:
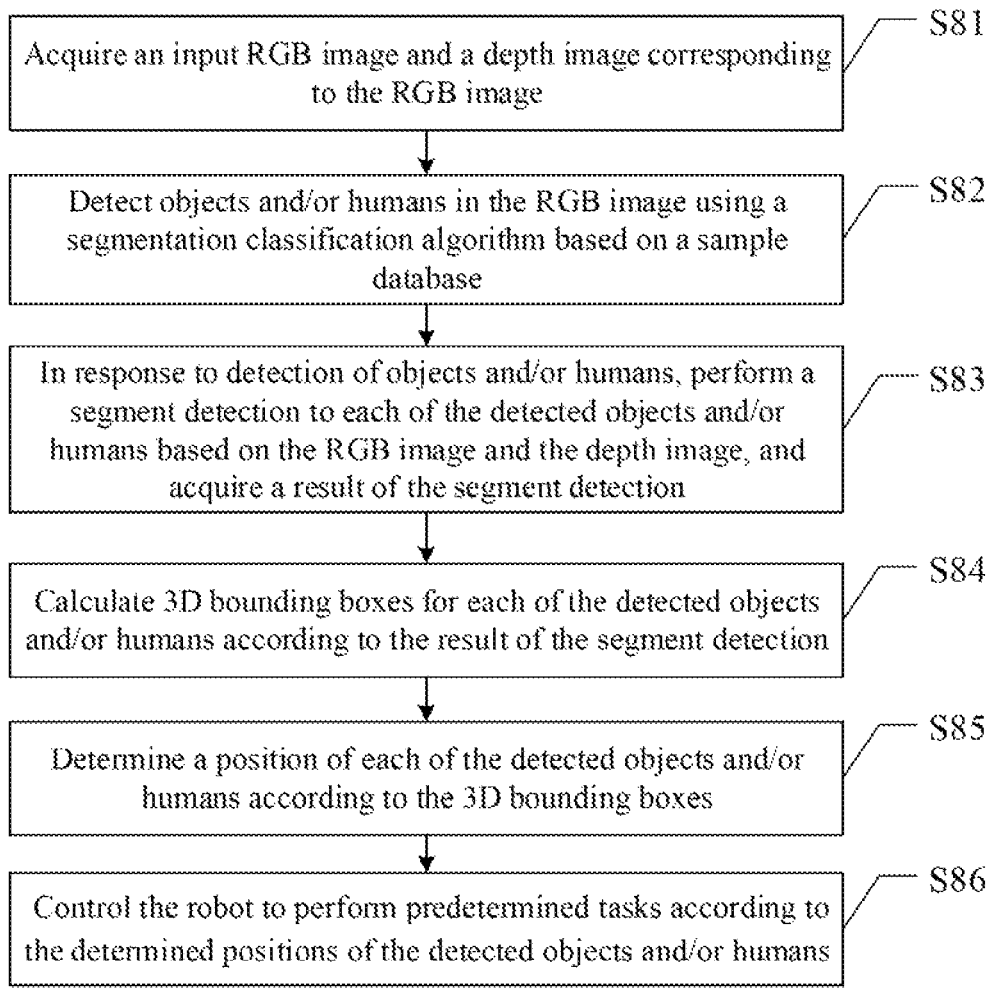
FIG. 8 is an exemplary flowchart of a human-object scene recognition method according to one embodiment.
Figure 9:
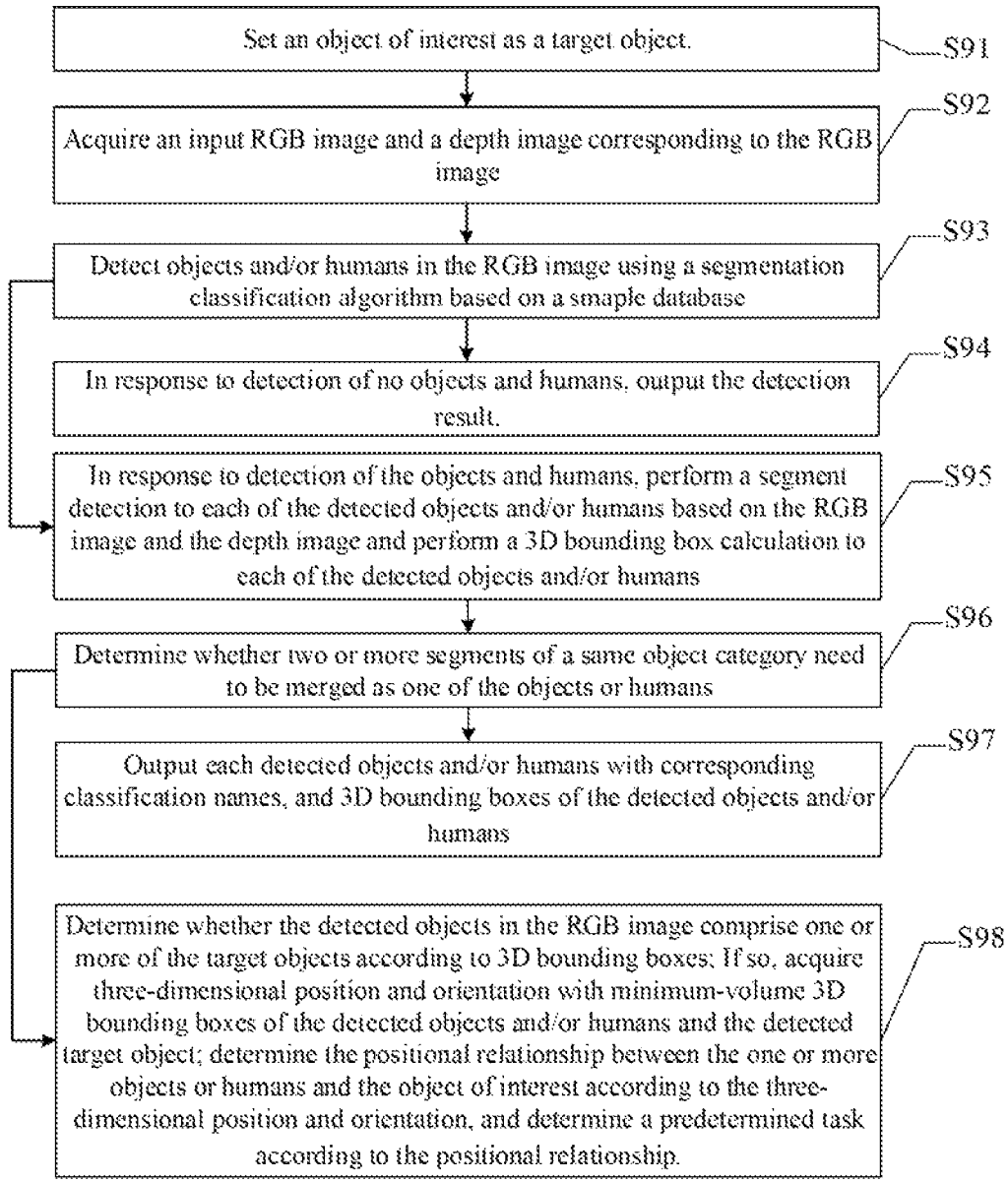
FIG. 9 is an exemplary flowchart of a human-object scene recognition method according to another embodiment.

When the processor 104 executes the computer programs 107, the steps in the embodiments of the method for controlling the robot 10, such as steps S81 through S86 in FIG. 8, steps S91 through S98 in FIG. 9, and steps S981 through S987 in FIG. 9, are implemented.

The processor 104 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like.

The storage 105 may be an internal storage unit of the robot 10, such as a hard disk or a memory. The storage 105 may also be an external storage device of the robot 10, such as a plug-in hard disk, a smart memory card (SMC), and a secure digital (SD) card, or any suitable flash cards. Furthermore, the storage 105 may also include both an internal storage unit and an external storage device. The storage 105 is used to store computer programs, other programs, and data required by the robot. The storage 105 can also be used to temporarily store data that have been output or is about to be output.

Exemplarily, the one or more computer programs 107 may be divided into one or more modules/units, and the one or more modules/units are stored in the storage 105 and executable by the processor 104. The one or more modules/units may be a series of computer program instruction segments capable of performing specific functions, and the instruction segments are used to describe the execution process of the one or more computer programs 107 in the robot 10. For example, the one or more computer programs 112 may be divided into an acquiring unit, a detecting unit, a recognition unit and a control unit. The acquiring unit is configured to acquire an input RGB image and a depth image corresponding to the RGB image. The detecting module is configured to detect objects and humans in the RGB image using a segmentation classification algorithm based on a sample database. The recognizing unit is configured to, in response to detection of objects and/or humans, determine a position of each of the detected objects and/or humans by performing a segment detection to each of the detected objects and/or humans based on the RGB image and the depth image and performing a 3D bounding box calculation to each of the detected objects and/or humans. The control unit is configured to control the robot to perform predetermined tasks according to the determined positions of the detected objects and/or humans.

Figure 11:
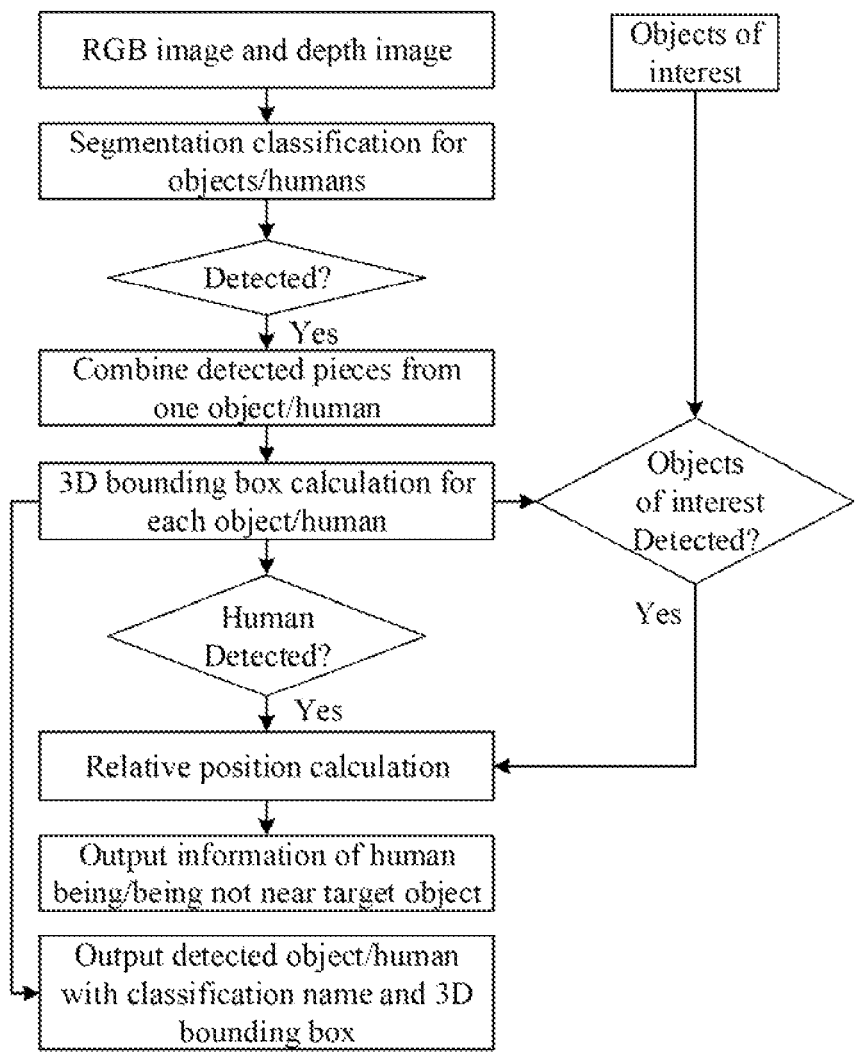
FIG. 11 is a processing logic flowchart of computer programs in a method for a robot to recognize a human-object scene.

A method for a robot to recognize a human-object scene according to embodiments of the present disclosure allow a robot to automatically set a target position and navigate while avoiding collisions. In addition, the method can also provide application scenarios such as whether a target object is in the scene, the position of the target object, and semantic information about whether human/other humans are near the target object. Specifically, referring to FIG. 11, an RGB image and a corresponding depth image are inputted. The RGB image would go through a segmentation classification algorithm first for the detection of common objects and humans in the scene. Before final 3D bounding boxes are generated, it needs to detect whether separate segments should be merged as one object. Final information of 3D bounding boxes of each detected object/human is generated and set as independent output, which can be directly used for robotics target position set up and/or collision avoiding in navigating process under needed situations. A customer assigned object(s) of interest can be taken as the target object(s) for the calculation as human-object or object-object relationship. The analysis of whether the detected object/human is near the target object(s) can only be performed when target object(s) (and person if only one object defined) are present in the scene. With the information of the 3D bounding boxes of target object(s) and a person, a stereo based calculation step is performed for the "near" check. An output of whether the person is near the target object(s) or whether two or more target objects are near each other would be generated. With the help of this human/object-environment interaction information, a guide for the robot-human-environment interaction can be achieved.

Figure 3:
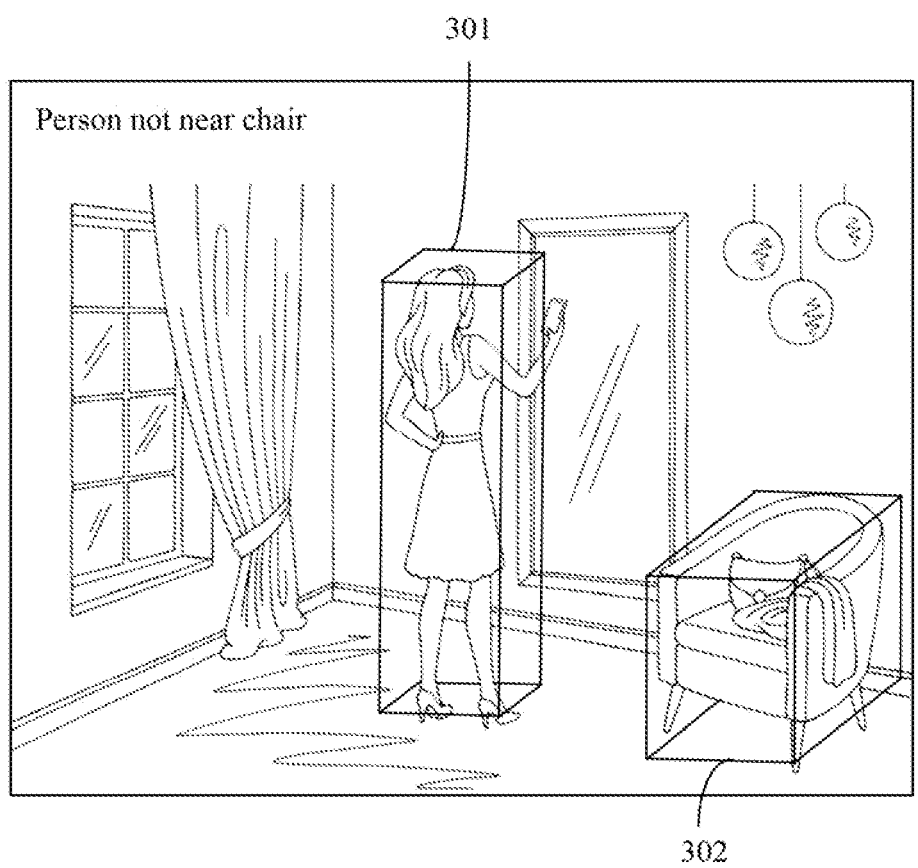
FIG. 3 shows an image of an exemplary scene including a person standing away from a chair.
Figure 4:
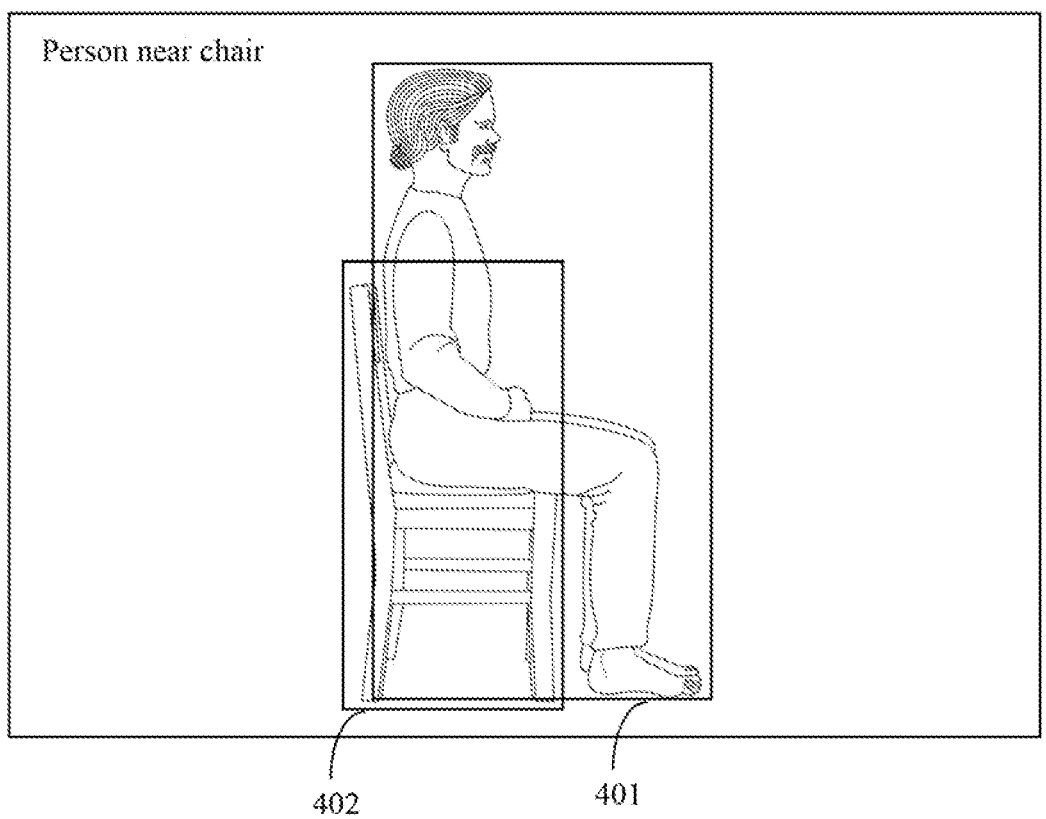
FIG. 4 shows an image of an exemplary scene including a person sitting on a chair.
Figure 5:
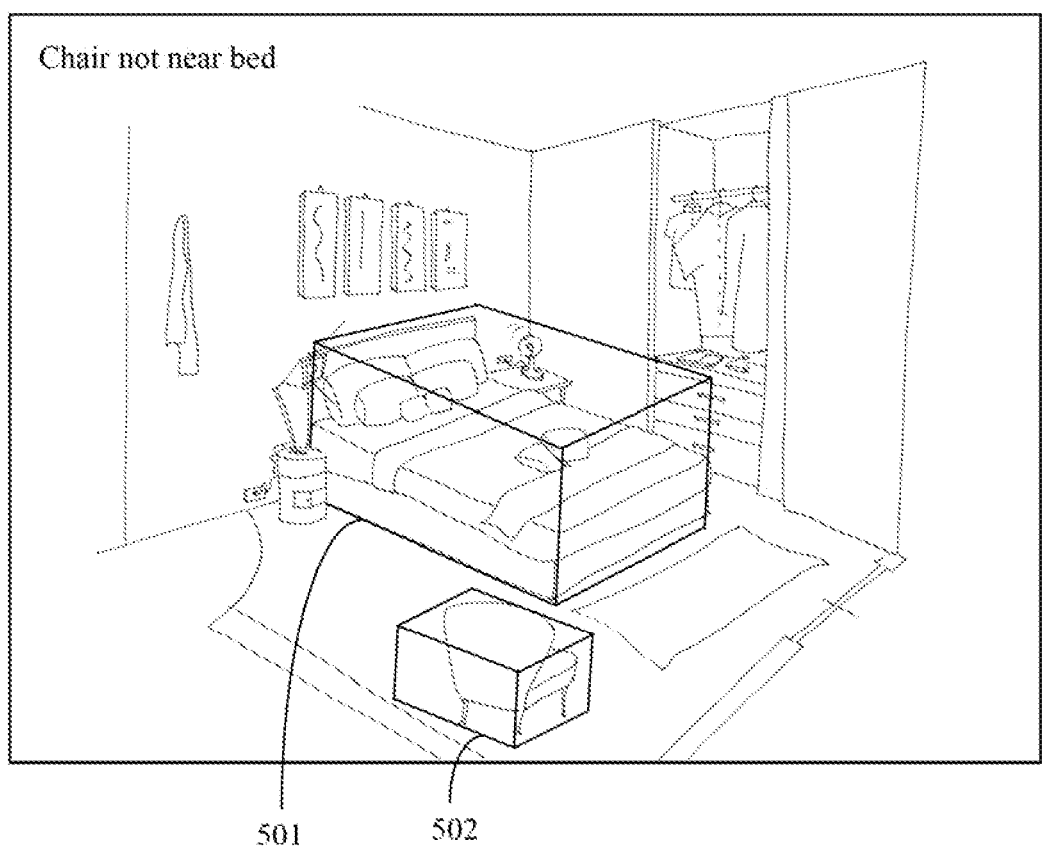
FIG. 5 shows an image of an exemplary scene including a bed and a chair standing away from the bed.
Figure 6:
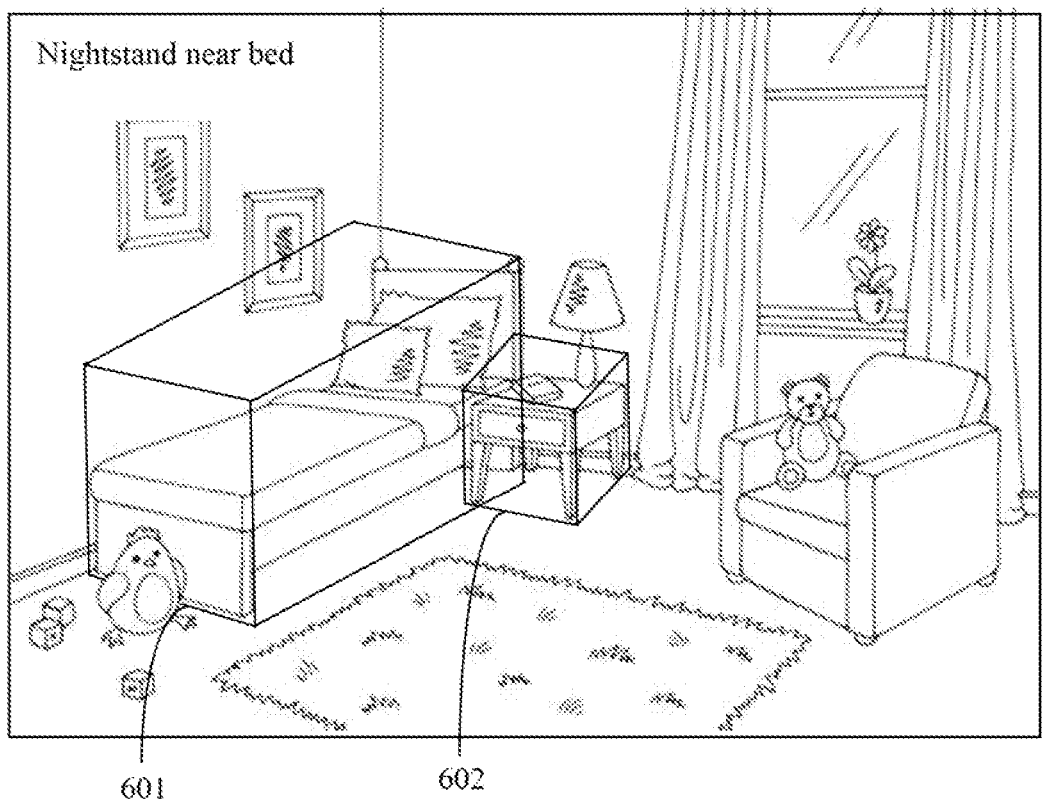
FIG. 6 shows an image of an exemplary scene including a bed and a nightstand near the bed.
Figure 7:
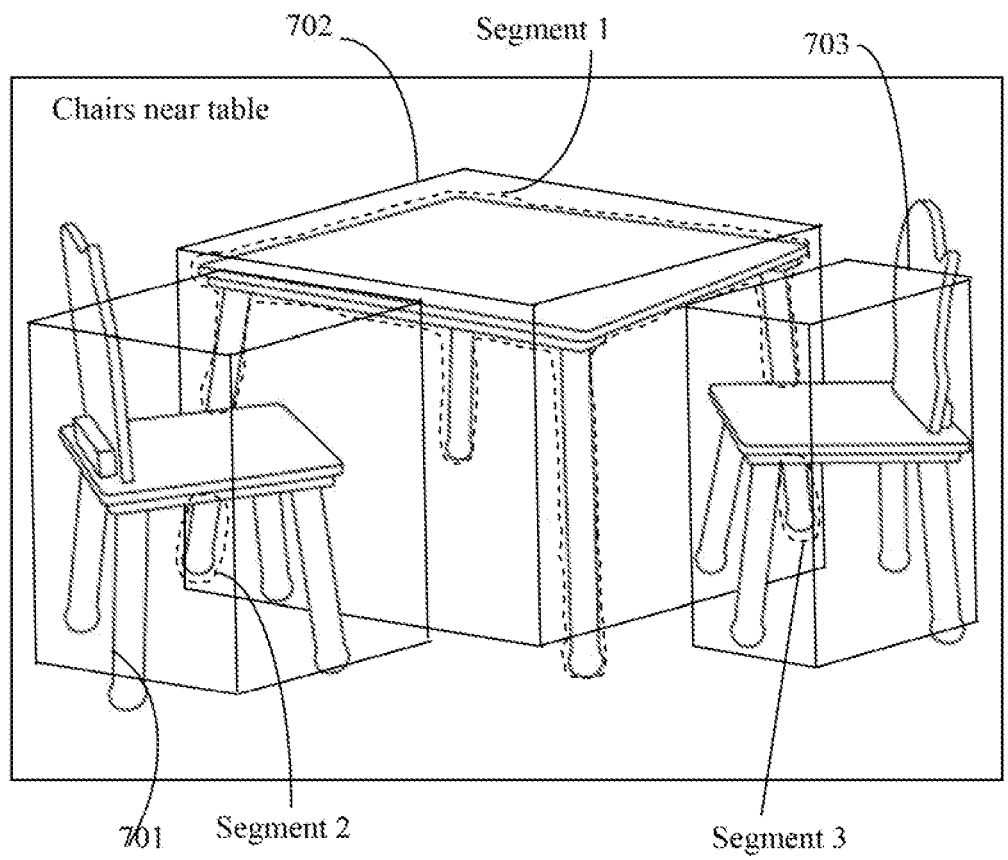
FIG. 7 shows an image of an exemplary scene including a table and two chairs.

The representative results of the understanding of the human-object relationship scene are shown in FIGS. 3 and 4. Specifically, FIGS. 3 and 4 show images containing a person and a chair, which are taken by the camera 101 of the robot which contain. In FIG. 3, the person is standing away from the chair, and in FIG. 4, the person is standing behind the chair. In each image, the upper left corner shows the recognition results of a target object (i.e., the chair) present in the scene, and information about whether the person is near the target object. The representative results of the understanding of the object-object relationship scene are shown in FIGS. 5-7. Specifically, FIG. 5 shows a chair away from a bed, FIG. 6 shows a nightstand in contact with the bed, and FIG. 7 shows two chairs near the table. In each image, the upper left corner shows the recognition results of target objects and information about whether the target objects are near each other.

In one embodiment, the recognized humans/objects in each image are surrounded by 3D bounding boxes. For example, the recognized human and chair in FIGS. 3 and 5-7 are surrounded by 3D bounding boxes 301, 302, 501, 502, 601, 602, 701, 702, and 703. It should be noted that the 2D bounding boxes surrounding the recognized human/chair in FIG. 4 are only for representation purpose.

The robot captures images through the camera 101 while moving, and sends the captured images to the processor 104. The processor 104 processes the captured images by executing executable computer programs 107 to complete the recognition of the human-object scene. Specifically, the processing process is as follows: acquiring an input RGB image and a depth image corresponding to the RGB image; detecting objects and/or humans in the RGB image using a segmentation classification algorithm based on a sample database; and in response to detection of objects and/or humans, determining a position of each of the detected objects and/or humans by performing a segment detection to each of the detected objects and/or humans based on the RGB image and the depth image and performing a 3D bounding box calculation to each of the detected objects and/or humans.

FIG. 8 shows an exemplary flowchart of a method for recognizing a human-object scene according to one embodiment. The method can be implemented to control the movement of the robot 10 shown in FIGS. 1 and 2, and can be specifically implemented the robot 10 shown in FIG. 2 or other control devices electrically coupled to the robot 10. The control devices may include, but are not limited to: desktop computers, tablet computers, laptop computers, multimedia players, servers, smart mobile devices (such as smart phones, handheld phones, etc.) and smart wearable devices (such as smart watches, smart glasses, smart cameras, smart bands, etc.) and other computing devices with computing and control capabilities. In one embodiment, the method may include steps S81 to S86.

Step S81: Acquiring an input RGB image and a depth image corresponding to the RGB image.

In one embodiment, the RGB-D three-dimensional sensor equipped on the robot 10 captures the scene image in front of the robot to obtain the RGB image and the depth image corresponding to the RGB image.

Step S82: Detecting objects and/or humans in the RGB image using a segmentation classification algorithm based on a sample database.

In one embodiment, the segmentation detection of the image is to detect the objects and/or humans in the input single RGB image by using a deep learning method. It should be noted that there may be only objects in the RGB image, only humans in the RGB image, or humans and objects in the RGB image. In one embodiment, the objects and humans refer to common objects and humans that are objects and humans in the ordinary sense and do not specifically refer to certain persons or certain objects. The image characteristics of various common objects and humans that may appear in each scene are pre-stored, which can serve as a basis for determining the characteristics of common objects and humans in image detection.

Step S83: In response to detection of objects and/or humans, performing a segment detection to each of the detected objects and/or humans based on the RGB image and the depth image, and acquiring a result of the segment detection.

In each of segments of the detected objects and/or humans, with the camera parameters taken into consideration, the depth values of the pixels of each segment can be used for three-dimensional coordinate calculation. The depth values can be obtained from the depth image corresponding to the RGB image.

Step S84: Calculating 3D bounding boxes for each of the detected objects and/or humans according to the result of the segment detection.

Step S85: Determining a position of each of the detected objects and/or humans according to the 3D hounding boxes.

Step S86: Controlling the robot to perform predetermined tasks according to the determined positions of the detected objects and/or humans.

The predetermined tasks correspond to the positions of the detected objects and humans. The robot can select pre-set tasks corresponding to the positions of the detected objects and humans according to the position distribution of the objects and humans in the recognized scene. The predetermined tasks may include bypassing obstacles, slow movement, interactions, and the like.

It should be noted that the method shown in FIG. 8 can be implemented by other devices, such as a computer equipped with a depth camera. In this case, the computer may output the determined positions of the detected objects and/or humans to a user after step S83.

FIG. 9 shows an exemplary flowchart of a method for a robot to recognize a human-object scene according to one embodiment. The method can be implemented to control the movement of the robot 10 shown in FIGS. 1 and 2, and can be specifically implemented by the robot 10 shown it FIG. 2 or other control devices electrically coupled to the robot 10.

In one embodiment, the method may include steps S91 to S98.

Step S91: Setting an object of interest as a target object.

In one embodiment, a user may input the name, shape, contour, size and other data of objects through a robot or computer to define the objects of interest. One or more objects inputted by the user as the objects of interest serve as a basis to for determining the human-object or object-object relationship. As shown in FIG. 3, the chair is set as the target object, and it is determined whether the human is near the chair in each frame of the image.

In one embodiment, "being near" means that the one or more objects of interest are in contact with at least one surface of another object or human. When the one or more objects of interest is not in contact with any surfaces of the object or human, it is determined as "being not near." In one embodiment, only when the target objects are present in the scene (if only one target object is defined, it is a person), can it be analyzed whether the target objects are near another object or human. A distance threshold can be preset as the criterion for "being near."

Step S92: Acquiring an input RGB image and a depth image corresponding to the RGB image.

In one embodiment, the RGB-D three-dimensional sensor equipped on the robot 10 captures the scene image in front of the robot to obtain the RGB image and the depth image corresponding to the RGB image.

Step S93: Detecting objects and/or humans in the RGB image using a segmentation classification algorithm based on a sample database.

In one embodiment, the segmentation classification algorithm is to detect common objects and humans in the scene. A deep learning method (e.g., Mask-RCNN algorithm) can be used to perform the segmentation detection of the image. The algorithm detects objects and humans in the RGB image, and the result of the detection is to generate a segmentation mask for the common objects and human in the RGB image, and obtain the coordinates of pixels of each of the common objects and humans. All of or a portion of the objects and humans in the image can be detected.

Step S94: In response to detection of no objects and humans, outputting the detection result.

Step S95: In response to detection of the objects and humans, performing a segment detection to each of the detected objects and/or humans based on the RGB image and the depth image and performing a 3D bounding box calculation to each of the detected objects and/or humans.

In each of segments of the detected objects and/or humans, with the camera parameters taken into consideration, the depth values of the pixels of each segment can be used for three-dimensional coordinate calculation.

In one embodiment, performing the segment detection to each of the detected objects and/or humans based on the RGB image and the depth image may include shrinking inwardly contours of objects and/or humans in each segment of the RGB image and the depth image inwardly using an erode algorithm, to acquire confident segments of the objects and/or humans in each segment of the RGB image and the depth image; and calculating 3D bounding boxes corresponding to shrank data using, a Convex Hull algorithm to compensate for volume of the objects and/or humans in each segment of the RGB image and the depth image.

The contour pixels in each segment have the highest possibility of misclassification, such as the pixels between the person and the background segment in FIG. 4. In order to eliminate this misclassification problem and improve robustness, it requires a method to shrink the contour of the segment and compensate for the volume. This method is to use the erode algorithm to inwardly shrink the contour of the detected objects/humans, and the shrinkage number is changed by defining the number of iterations. It is worth noting that the number of iterations is an adjustable parameter and can be different for different objects/humans. The shrinking leads to a reliable segmentation of the objects/humans. Then the Convex Hull algorithm is used to calculate the 3D bounding boxes corresponding to the shrunk data. The values of the 3D bounding boxes, which are adjustable variables, are increased by a certain amount. This process is called compensation for the volume. It should be noted that the above-mentioned calculation is performed for each segmentation. Later, it will be determined whether to perform the merge operation based on the relative positions of the same objects/humans.

The pixels that shrink along the contour of the line segment and the volume value to be added are parameters that can be adjusted to achieve the best balance. Specifically, based on the camera mounting height and quantronium information, the point group of each segment can be expressed using base frame X-, Y-, and Z-coordinates, where the X-Y plane is the ground in the real world, and Z- is for height. With the assumption that all objects (especially furniture) and humans discussed here are dynamically stable in base frame, all 3D Bounding boxes discussed later have at least one plane parallel to the X-Y plane.

To maintain the minimum memory/CPU cost of each calculation step, a Convex Hull calculation is applied for the point group of each segment. The Convex Hull calculation is to save the shape data of the target objects with the least data, and the target objects refers to the objects currently being analyzed. The Convex Hull calculation method specifically refers to a method based on the coordinates of the vertices of the outermost contour of the objects. At the algorithm level, the Convex Hull can calculate whether each point is contained in the closed graph formed by the rest of the points. If it is contained in the closed graph, the point will be discarded. If it is not contained in the closed graph, the point will be used as a new contribution point to form a closed graph, until no point can be surrounded by the closed graph formed by the rest of the points.

It should be noted that the Convex Hull only applies to the projected coordinated to the X-Y plane of each point group and for the Z- values, only minimum/maximum values are needed. Instead of using thousands of points initially in the point group of each segment, 30 points may be extracted as the Convex Hull points which persist all useful information for the 3D bounding box calculation. The useful information here refers to the coordinates, the shape, size and pose of the objects/humans being processed. The convex hull points are the output result of the convex hull algorithm. The projection of these convex hull points on the ground plane is the vertices of the outer boundary of the projection of the objects/humans on the ground plane. The heights of the convex hull points are the height values of the upper and lower planes of the objects/humans, and the upper surface height or the lower surface height is randomly selected here.

It should be noted that the method used in detecting, a target human is the same as the method of detecting a target object described above, and the target human refers to the human currently being analyzed. Through the calculation above, a three-dimensional position/orientation with a minimum-volume bounding box can be generated for each analyzed object/human in the scene in the RGB image.

Step S96: Determining whether two or more segments of a same object category need to be merged as one of the objects or humans.

In one embodiment, it is first determined whether the two or more segments are a portion of the one of the objects or humans according to three-dimensional positions, directions, sizes, and tolerance threshold distances of the 3D bounding boxes of the two or more segments. One object/human may include multiple discontinuous segments due to occlusion. Therefore, it is necessary to determine whether two or more segments are a portion of one object/human. In response to the two or more segments being a portion of the one of the objects or humans, merge the two or more segments as the one of the objects or humans. In response to the two or more segments being not a portion of the one of the objects or humans, determine not to merge the two or more segments as one of the objects or humans.

Specifically, due to occlusion, the segments of the same object category may be multiple segments of the same object. For example, due to the existence of the chairs, the table in FIG 7 is separated into three segments 1, 2, and 3. Therefore, before generating the final 3D bounding boxes, an additional step is performed to check whether the two or more segments need to be merged into one object/human. The calculation is based on the three-dimensional positions, directions and sizes of the bounding boxes of each segment. A tolerance threshold distance is also set as an adjustable parameter for best performance.

Step S97: Outputting each detected objects and/or humans with corresponding classification names, and 3D bounding boxes of the detected objects and/or humans.

After Step S96, the information of the 3D bounding boxes of each object/person is generated and set as independent output, this can be directly used for robotics target position set up automatically and/or collision avoiding in navigating process under needed situations.

Step S98: Determining whether the detected objects in the RGB image comprise the target object according to 3D bounding boxes; in response to detection of the target object, acquiring three-dimensional position and orientation with minimum-volume 3D bounding boxes of the detected objects and/or humans and the detected target object; determining the positional relationship between the one or more objects or humans and the objects of interest according to the three-dimensional position and orientation, and determining a predetermined task according to the positional relationship.

In one embodiment, determining the positional relationship between the one more objects or humans and the objects of interest according to the three-dimensional position and orientation may include determining whether the one or more of the detected objects and/or humans are near the detected target object by performing a stereo based calculation based on the information of the 3D bounding boxes of the detected object and the one or more of the detected objects and/or humans.

Figure 10:
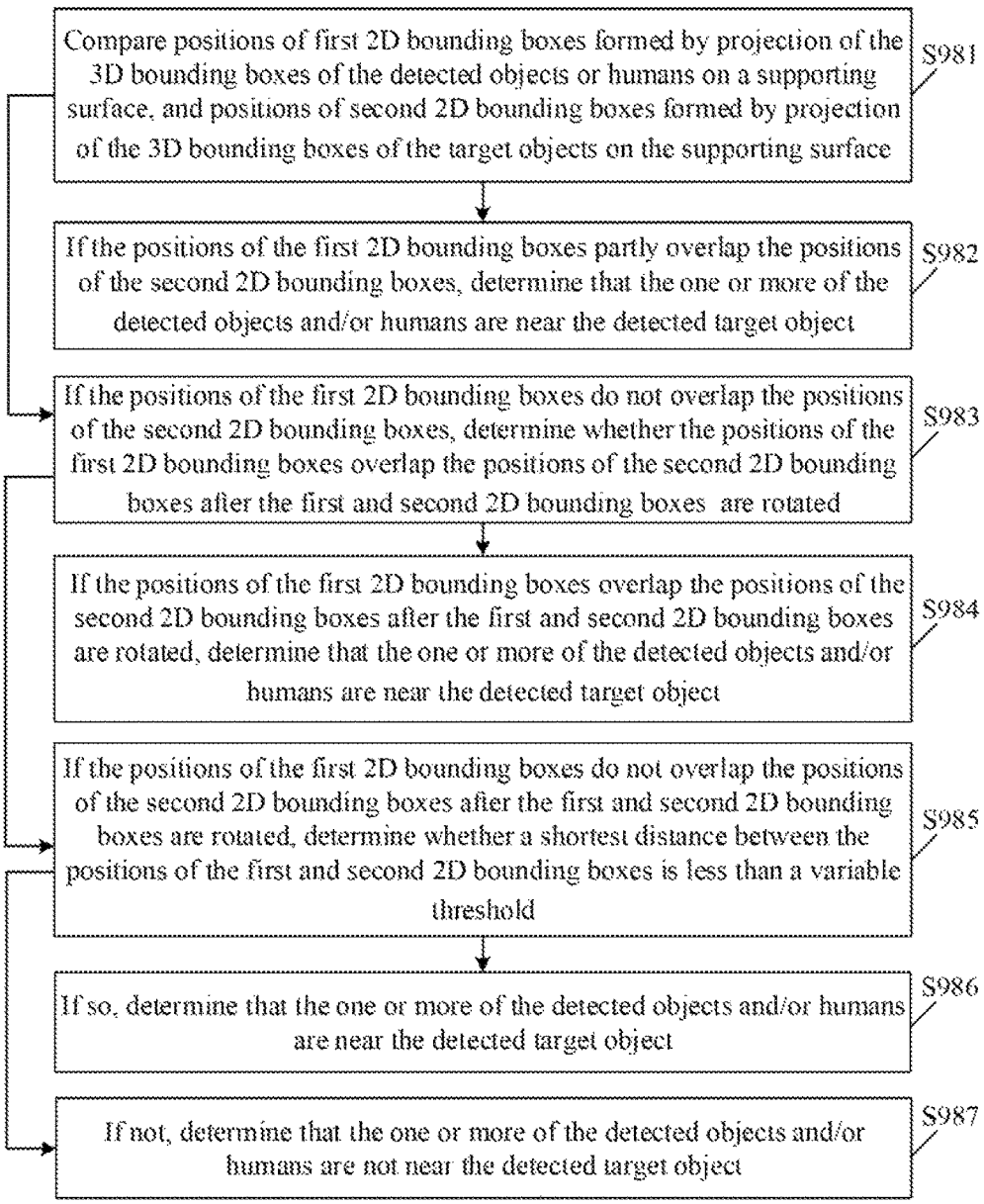
FIG. 10 is an exemplary flowchart of step S98 of the method of FIG. 9.

In one embodiment, determining positional relationship between the one or more if the detected objects and/or humans and the detected target object according to the three-dimensional position and orientation may include determining whether the one or more of the detected objects and/or humans are near the detected target object by performing a stereo based calculation based on the information of the 3D bounding boxes of the detected objects and the one or more of the detected objects and/or humans. Referring to FIG. 10, step S98 may include the following steps.

Step S981: Comparing positions of first 2D bounding boxes formed by projection of the 3D bounding boxes of the detected objects or humans on a supporting surface (e.g., floor, ground, etc.), with positions of second 2D bounding boxes formed by projection of the 3D bounding boxes of the target object on the supporting surface.

Specifically, the objects or humans outside one target object are compared with the target object to determine the position relationship between the objects or humans and the target object. The position relationship includes "near" and "not near".

Step S982: In response to the positions of the first 2D bounding boxes partly overlapping the positions of the second 2D bounding boxes, determining that the one or more of the detected objects and/or humans are near the detected target object.

Step S983: In response to the positions of the first 2D bounding boxes not overlapping the positions of the second 2D bounding boxes, determining whether the positions of the first 2D bounding boxes overlap the positions of the second 2D bounding boxes after the first 2D bounding boxes and the second 2D bounding boxes are rotated.

Step S984: In response to the positions of the first 2D bounding boxes overlapping the positions of the second 2D bounding boxes after the first 2D bounding boxes and the second 2D bounding boxes are rotated, determining that the one or more of the detected objects and/or humans are near the detected target object.

Step S985: In response to the positions of the first 2D bounding boxes not overlapping the positions of the second 2D bounding boxes after the first 2D bounding boxes and the second 2D bounding boxes are rotated, determining whether a shortest distance between the positions of the first 2D bounding boxes and the second 2D bounding boxes is less than a variable threshold.

In one embodiment, the variable threshold is variable for each target object.

Step S986: In response to the shortest distance between the positions of the first 2D bounding boxes and the second 2D bounding boxes being less than the variable threshold, determining that the one or more of the detected objects and/or humans are near the detected target object.

Step S987: In response to the shortest distance between the positions of the first 2D bounding boxes and the second 2D bounding boxes being greater than the variable threshold, determining that the one or more of the detected objects and/or humans are not near the detected target object.

By outputting whether the objects or humans are near the target object, or whether multiple target objects (for example, two target objects) are near each other, it can realize the guidance of robot-human-environment interaction.

When implemented by a robot, the method according to the aforementioned embodiments can provide scene understanding information based on the relationship between the robot and the objects/humans in the RGB image. The scene understanding information may include positional relationship between the target object and other detected objects and/or humans, which serves as a basis for the next operation to be performed. This can be critical in various daily situations when human reaches a target object, the robot would be able to react quickly and perform the assistance accordingly. For example, when an old person sits on the chair, a robot would detect this scene and approach the person and provide water/food/other assistance as needed.

The method according to the aforementioned embodiments has advantages as follows. By combining the segmentation and classification results with depth information, the position and direction of objects and human in the three-dimensional space are detected, and the position of all custom input objects can be determined, and the direction can be determined according to their presence in the current scene. This can further be used for robotics target position set up as well as occlusion avoidance by navigation. Note the position and orientation can be dynamically updated based on position change of the robot. Shrinking contour and compensating for volume are introduced to remove misclassification values. The Convex Hull is used for the minimum memory/CPU cost while persisting all useful information, The stereo-based calculation method is introduced to merge occlusion caused segmentation pieces into one object. The semantic scene understanding system is developed and allows a user to set target objects. The system is easy to apply to any scenes or objects of interest.

The method according to the aforementioned embodiments can be used for object stereo information calculation, finding target objects in current scene, and scene understanding of human-object and object-object relationship. The RGBD camera sensor is economic and can be arranged on various positions of the robot with different quantronium angle. With the knowledge of camera mounting height and quantronium values, a relative position/orientation angle of each object near the robot and the objects relationship can be generated.

Figure 12:
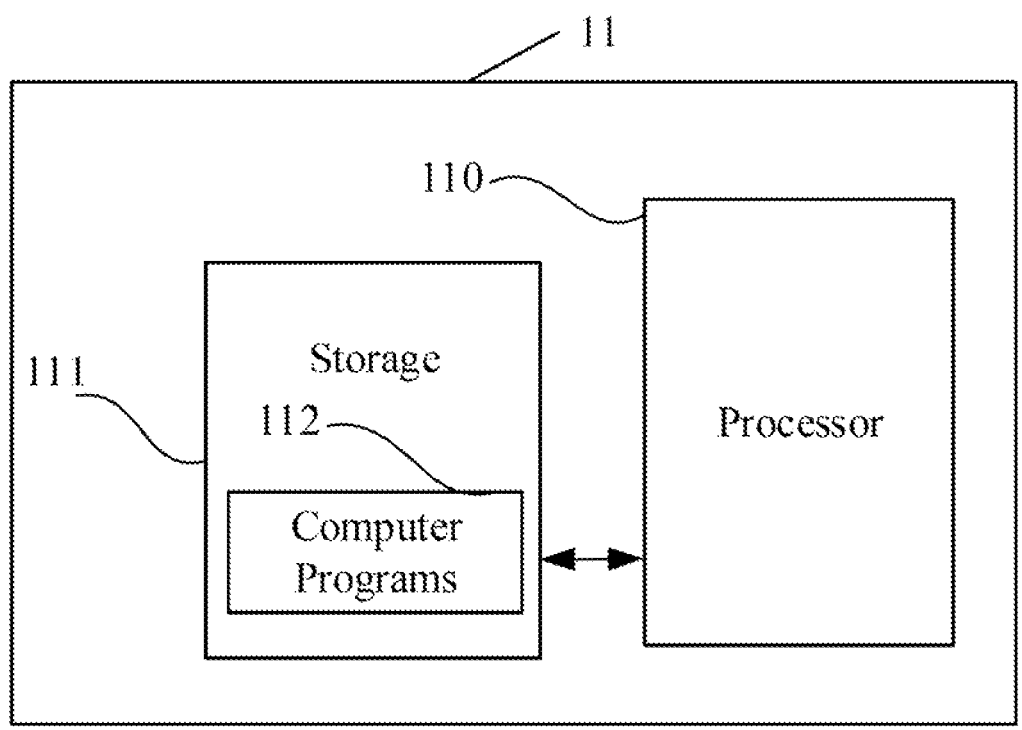
FIG. 12 is schematic block diagram of a human-object recognition device according to one embodiment.

FIG. 12 is a schematic block diagram of a human-object recognizing device according to one embodiment. The human-object recognizing device may include, but are not limited to: cellular phones, smart phones, other wireless communication devices, personal digital assistants, and audio players, other media players, music recorders, video recorders, cameras, other media recorders, radios, vehicle transportation equipment, laptop computers, desktop computers, netbook computers, Personal Digital Assistants (PDA), Portable Multimedia Players (PMP), Moving Picture Experts Group (MPEG-1 or MPEG-2) Audio Layer 3 (MP3) players, portable gaming devices (such as Nintendo DS™, PlayStation Portable™) Gameboy Advance™, iPhone™), portable Internet devices, data storage devices, smart wearable devices (or example, head mounted devices (HMD) such as smart glasses, smart clothes, smart bracelets, smart necklaces, or smart watches), digital cameras and their combinations. According to actual needs, the device can be installed on the robot, or it can be the robot itself. In some cases, the device can perform multiple functions, such as, playing music, displaying videos, storing pictures, and receiving and sending phone calls.

In one embodiment, the device may include a processor 110, a storage 111 and one or more executable computer programs 112 that are stored in the storage 111 and executable by the processor 110. When the processor 110 executes the computer programs 112, the steps in the embodiments of the method for controlling the robot 10, such as steps S81 to S86 in FIG. 8, are implemented.

Exemplarily, the one or more computer programs 112 may be divided into one or more modules/units, and the one or more modules/units are stored in the storage 111 and executable by the processor 110. The one or more modules/units may be a series of computer program instruction segments capable of performing specific functions, and the instruction segments are used to describe the execution process of the one or more computer programs 112 in the device. For example, the one or more computer programs 112 may be divided into an acquiring unit, a detecting unit, a recognition unit and a control unit.

The acquiring unit is configured to acquire an input RGB image and a depth image corresponding to the RGB image. The detecting module is configured to detect objects and humans in the RGB image using a segmentation classification algorithm based on a sample database. The recognizing unit is configured to, in response to detection of objects and/or humans, determine a position of each of the detected objects and/or humans by performing a segment detection to each of the detected objects and/or humans based on the RGB image and the depth image and performing a 3D bounding box calculation to each of the detected objects and/or humans. The control unit is configured to control the robot to perform predetermined tasks according to the determined positions of the detected objects and/or humans.

Those skilled in the art can understand that FIG. 12 is only an example of the device 11, and does not constitute a limitation on the device 11. In practical applications, it may include more or fewer components, or a combination of certain components, or different components. For example, the device 11 may also include: input/output devices (such as keyboards, microphones, cameras, speakers, display screens, etc.), network connections access equipment, buses, sensors, etc.

The processor 110 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like.

The storage 111 may be an internal storage unit, such as a hard disk or a memory. The storage 111 may also be an external storage device, such as a plug-in hard disk, a smart memory card (SMC), and a secure digital (SD) card, or any suitable flash cards. Furthermore, the storage 111 may also include both an internal storage unit and an external storage device. The storage 111 is used to store computer programs, other programs, and data required by the robot. The storage 111 can also be used to temporarily store data that have been output or is about to be output.

In one embodiment, a non-transitory computer-readable storage medium is provided. The non-transitory computer-readable storage medium may be configured in the robot 10 shown in FIG. 1 or in the device shown in FIG. 12. The non-transitory computer-readable storage medium stores executable computer programs, and when the programs are executed by the one or more processors of the robot 10, the human-object scene recognition method described in the embodiments above is implemented.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units and modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In one embodiment, a non-transitory computer-readable storage medium that may be configured in the robot 10 or the mobile robot control device as described above. The non-transitory computer-readable storage medium may be the storage unit configured in the main control chip and the data acquisition chip in the foregoing embodiments. One or more computer programs are stored on the non-transitory computer-readable storage medium, and when the computer programs are executed by one or more processors, the robot control method described in the embodiment above is implemented.

In the embodiments above, the description of each embodiment has its own emphasis. For parts that are not detailed or described in one embodiment, reference may be made to related descriptions of other embodiments.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals. It should be noted that, the content included in the computer readable medium could be appropriately increased and decreased according to requirements of legislation and patent practice under judicial jurisdictions. For example, in some judicial jurisdictions, the computer readable medium does not include the electric carrier signal and the telecommunication signal according to the legislation and the patent practice.

The foregoing description, for purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the present disclosure and its practical applications, to thereby enable others skilled in the art to best utilize the present disclosure and various embodiments with various modifications as are suited to the particular use contemplated.

What is claimed is:

1. A computer-implemented human-object scene recognition method executed by one or more processors, the method comprising:
    acquiring an input RGB image and a depth image corresponding to the RGB image;
    detecting objects and/or humans in the RGB image using a segmentation classification algorithm based on a sample database;
    in response to detection of objects and/or humans, performing a segment detection to each of the detected objects and/or humans based on the RGB image and the depth image, and acquiring a result of the segment detection:
    calculating 3D bounding boxes for each of the detected objects and/or humans according to the result of the segment detection; and
    determining a position of each of the detected objects and/or humans according to the 3D bounding boxes;
    wherein detecting the objects and/or humans in the RGB image using the segmentation classification algorithm based on the sample database comprises:
        generating segmentation masks for the objects and/or humans in the RGB image to acquire coordinates of pixels corresponding to each of the objects and/or humans in the RGB image; and
    wherein performing the segment detection to each of the detected objects and/or humans based on the RGB image and the depth image comprises:
        shrinking contours of objects and/or humans in each seoment of the RGB image and the depth image inwardly using an erode algorithm, to acquire confident segments of the objects and/or humans in each segment of the RGB image and the depth image; and
        calculating the 3D bounding boxes corresponding to shrank data using a Convex Hull algorithm to compensate for volume of the objects and/or humans in each segment of the RGB image and the depth image.

2. The method of claim 1, further comprising, before acquiring the input ROB image and the depth image corresponding to the RGB image,
    setting an object of interest as a target object.

3. The method of claim 2, further comprising, after determining the position of each of the detected objects andior humans according to the 3D bounding boxes,
    determining, whether the detected objects in the RGB image comprise the target object according to the 3D bounding boxes;
    in response to detection of the target object, acquiring three-dimensional position and orientation with minimum-volume 3D bounding boxes of the detected objects and/or humans and the detected target object; and
    determining positional relationship between the one or more of the detected objects and/or humans and the detected target object according to the three-dimensional position and orientation.

4. The method of claim 1, further comprising, after calculating 3D bounding boxes for each of the detected objects andlor humans according to the result of the segment detection,
    determining whether two or more segments of a same object category need to be merged as one of the objects or humans.

5. The method of claim 4, wherein determining whether the two or more segments of the same object category need to be merged as one of the objects or humans comprises:
    determining whether the two or more segments are a portion of the one of the objects or humans according to three-dimensional positions, directions, sizes, and tolerance threshold distances of the 3D bounding boxes of the two or more segments;
    in response to the two or more segments being the portion of the one of the objects or humans, merging the two or more segments as the one of the objects or humans; and
    in response to the two or more segments not being the portion of the one of the objects or humans, determining not to merge the two or more segments as one of the objects or humans.

6. The method of claim 3, wherein determining positional relationship between the one or more of the detected objects and/or humans and the detected target object according to the three-dimensional position and orientation comprises:
    determining whether the one or more of the detected objects and/or humans are near the detected target object by performing a stereo based calculation based on information of the 3D bounding boxes of the target object and the one or more of the detected objects and/or humans.

7. The method of claim 6, wherein determining whether the one or more of the detected objects andior humans are near the detected target object by performing the stereo-based calculation based on the information of the 3D bounding boxes of the target object and the one or more of the detected objects and/or humans comprises:
    comparing positions of first 2D bounding boxes formed by projection of the 3D bounding boxes of the detected objects or humans on a supporting surface, with positions of second 2D bounding boxes fbmied by projection of the 3D bounding boxes of the target object on the supporting suiface;
    in response to the positions of the first 2D hounding boxes overlapping the positions of the second 2D bounding boxes, determining that the one or more of the detected objects and/or humans are near the detected target object;
    in response to the positions of the first 2D bounding boxes not overlapping the positions of the second 2D bounding boxes, determining whether the positions of the first 2D bounding boxes overlap the positions of the second 2D bounding boxes after the first 2D bounding boxes and the second 2D bounding boxes are rotated;
    in response to the positions of the first 2D bounding boxes overlapping the positions of the second 2hounding boxes after the first 2D bounding boxes and the second 2D bounding boxes are rotated, determining that the one or more of the detected objects and/or humans are near the detected target object;

in response to the positions of the first 2D bounding boxes not overlapping the positions of the second 2D bounding boxes after the first 2D bounding boxes and the second 2D bounding boxes are rotated, determining whether a shortest distance between the positions of the first 21) bounding boxes and the second 2D bounding boxes is less than a variable threshold:

in response to the shortest distance between the positions of the first 2D bounding boxes and the second 2D hounding boxes being less than the variable threshold, determining that the one or more of the detected objects and/or humans are near the detected target object.

8. The method of claim 3, further comprising, after determining positional relationship between the one or more of the detected objects and/or humans and the detected target object according to the three-dimensional position and orientation, outputting the detected objects or humans and the target object.

9. The method of claim 1, further comprising, after determining a position of each of the detected objects and/or humans by performing the segment detection to each of the detected objects and or humans based on the RGB image and the depth image and performing the 3D bounding box calculation to each of the detected objects and/or humans, outputting each of the detected Objects and/or humans with corresponding classification names, and 3D bounding boxes of the detected objects and/or humans.

10. The method of claim 1, further comprising, after determining a position of each of the detected objects and/or humans according to the 3D bounding boxes, controlling a robot to perform predetermined tasks according to the determined positions of the detected objects and/or humans.

11. The method of claim 3, further comprising, after determining positional relationship between the one or more of the detected objects and/or humans and the detected target object according to the three-dimensional position and orientation, determining a task corresponding to the positional relationship: and controlling a robot to perform the task.

12. A human-object recognition device comprising:
one or more processors;
a memory; and
one or more programs, wherein the one or more programs are stored in the memory and configured to be executed by the one or more processors, the one or more programs comprise:
instructions for acquiring an input RGBs image and a depth image corresponding to the RGB image;
instructions for detecting objects and/or humans in the RGB image using a segmentation classification algorithm based on a sample database;
instructions for, in response to detection of objects and/or humans, performing a segment detection to each of the detected objects and/or humans based on the RGB image and the depth image, and acquiring a result of the segment detection;
instructions for calculating 3D bounding boxes for each of the detected objects and/or humans according to the result of the segment detection;
instructions for determining a position of each of the detected objects and/or humans according to the 3D bounding boxes; and
instructions for after calculating the 3D bounding boxes for each of the detected objects and/or humans according to the result of the segment detection, determining whether two or more segments of a same object category need to be merged as one, of the objects or humans;

wherein the instructions for determining whether the two or more segments of the same object category need to be merged as one of the objects or humans comprises:
instructions for determining whether the two or more segments are a portion of the one of the objects or humans according to three-dimensional positions, directions, sizes, and tolerance threshold distances of the 3D bounding boxes of the two or more segments;
instructions for in response to the two or more segments being the portion of the one of the objects or humans, merging. the two or more segments as the one of the objects or humans; and
instructions for in response to the two or more segments not being the portion of the one of the objects or humans, determining not to merge the two or more senments as one of the objects or humans.

13. The device of claim 12, further comprising instructions for setting an object of interest as a target object before acquiring the input RGB image and the depth image corresponding to the RGB image.

14. The device of claim 13, further comprising instructions for, after determining the position of each of the detected objects and/or humans,
determining whether the detected objects in the RGB image comprise the target object according to the 3D bounding boxes;
in response to detection of the target object, acquiring three-dimensional position and orientation with minimum-volume 3D bounding boxes of the detected objects and/or humans and the detected target object; and
determining positional relationship between the one or more of the detected objects and/or humans and the detected target object according to the three-dimensional position and orientation.

15. The device of claim 12, wherein the instructions for detecting the objects and/or humans in the RGB image using the segmentation classification algorithm based on the sample database comprise:
instructions for generating segmentation masks for the objects and/or humans in the RGB image to acquire coordinates of pixels corresponding to each of the objects and/or humans in the RGB image.

16. The device of claim 14, wherein the instructions for determining positional relationship between the one or more of the detected objects and/or humans and the detected target of according to the three-dimensional position and orientation comprise:
instructions for determining whether the one or more of the detected objects and/or humans are near the detected target object by performing a stereo based calculation based on information of the 3D bounding boxes of the detected objects and the one or more of the detected objects and/or humans.

17. The device of claim 16, wherein the instructions for determining whether the one or more of the detected objects and/or humans are near the detected target object by performing a stereo based calculation based on information of the 3D bounding boxes of the detected objects and the one or more of the detected objects and/or humans comprise:
instructions for comparing positions of first 2D bounding boxes formed by projection of the 3D bounding boxes of the detected objects or humans on a supporting surface, with positions of second 2D bounding boxes formed by projection of the 3D bounding boxes of the target object on the supporting surface;

instructions for, in response to the positions of the first 2D bounding boxes overlapping the positions of the second 2D bounding boxes, determining that the one or more of the detected objects and/or humans are near the detected target object;

instructions for, in response to the positions of the first 2D bounding boxes not overlapping the positions of the second 2D bounding boxes, determining whether the positions of the first 2D bounding boxes overlap the positions of the second 2D bounding boxes after the first 2D bounding boxes and the second 2D bounding boxes are rotated;

instructions for, in response to the positions of the first 2D bounding boxes overlapping the positions of the second 2D bounding, boxes after the first 2D bounding boxes and the second 2D bounding boxes are rotated, determining that the one or more of the detected objects and/or humans are near the detected target object;

instructions for, in response to the positions of the first 2D bounding boxes not overlapping the positions of the second 2D bounding boxes after the first 2D bounding boxes and the second 2D bounding boxes are rotated, determining whether a shortest distance between the positions of the first 2D bounding boxes and the second 2D bounding boxes is less than a variable threshold;

instructions for, in response to the shortest distance between the positions of the first 2D bounding boxes and the second 2D bounding boxes being less than the variable threshold, determining that the one or more of the detected objects and/or humans are near the detected target object.

18. A non-transitory computer-readable storage medium storing one or more programs to be executed by one or more processors of a human-object recognition device, the one or more programs, when being executed by one or more processors, causing the human-object recognition device to perform processing comprising:

acquiring an input RGB image and a depth image corresponding to the RGB image;

detecting objects and/or humans in the RGB image using a segmentation classification algorithm based on a sample database;

in response to detection of objects and/or humans, performing a segment detection to each of the detected objects and/or humans based on the RGB image and the depth image, and acquiring a result of the segment detection;

calculating 3D bounding boxes for each of the detected objects and/or humans according to the result of the segment detection; and determining a position of each of the detected objects and/or humans according to the 3D bounding boxes;

wherein the processing further comprises: before acouiring the input RGB imiige and the depth image corresponding to the RGB image,
setting an object of interest as a target object;

wherein the processing further comprises: after determining the)osition of each of the detected objects and/or humans according to the 3D bounding boxes,
determining whether the detected objects in the RGB image comprise the target object according to the 3D bounding boxes;
in response to detection of the target object. acquiring three-dimensional position and orientation with minimum-volume 3D bounding boxes of the detected objects and/or humans and the detected target object; and
determining positional relationship between the one or more of the detected objects and/or humans and the detected target object according to the three-dimensional position and orientation;

wherein determining the positional relationship between the one or more of the detected objects and/or humans and the detected target object according to the three-dimensional position and orientation comprises:
determining whether the one or more of the detected objects and/or humans are near the detected target object by performing a stereo based calculation based on information of the 3D bounding boxes of the target object and the one or more of the detected objects and/or humans.

19. The non-transitory computer-readable storage medium of claim 18, wherein detecting the objects and/or humans in the RGB image using the segmentation classification algorithm based on the sample database comprises:
generating segmentation masks for the objects and/or humans in the RGB image to acquire coordinates of pixels corresponding to each of the objects andlor humans in the RGB image.

20. The non-transitory computer-readable storage medium of claim 19, wherein performing the segment detection to each of the detected objects and/or humans based on the RGB image and the depth image comprises:
shrinking contours of objects and/or humans in each segment of the RGB image and the depth image inwardly using an erode algorithm, to acquire confident segments of the objects and/or humans in each segment of the RGB image and the depth image; and
calculating the 3D bounding boxes corresponding to shrank data using a Convex Hull algorithm to compensate for volume of the objects and/or humans in each segment of the RGB image and the depth image.

* * * * *